(12) United States Patent
Chao

(10) Patent No.: US 6,264,323 B1
(45) Date of Patent: Jul. 24, 2001

(54) ASSEMBLY OF PRIMARY AND AUXILIARY EYEGLASSES WHICH ARE INTERCONNECTED BY A RETAINER CLIP

(76) Inventor: David Chao, 1120 Green Acre Rd., Towson, MD (US) 21204

( * ) Notice: Subject to any disclaimer, the term of this patent is extended or adjusted under 35 U.S.C. 154(b) by 0 days.

(21) Appl. No.: 09/551,389

(22) Filed: Apr. 18, 2000

(51) Int. Cl.[7] .................................... G02B 9/00
(52) U.S. Cl. ............................... 351/47; 351/57
(58) Field of Search .................. 351/47, 48, 57, 351/58, 44, 41

(56) References Cited

U.S. PATENT DOCUMENTS 6,053,611 * 4/2000 Ku .......................................... 351/47
6,089,708 * 7/2000 Ku .......................................... 351/47

* cited by examiner

Primary Examiner—Hung Xuan Dang
(74) Attorney, Agent, or Firm—Harness, Dickey & Pierce, P.L.C.

(57) ABSTRACT

An eyeglass assembly includes a pair of first eyeglasses having two first lenses and a first bridge that interconnects the first lenses, and a pair of second eyeglasses having two second lenses and a second bridge that interconnects the second lenses. A retaining clip is disposed fixedly on the second bridge, and is formed with a restricting groove unit, within which a portion of the first bridge is received fittingly, so as to clamp the portion of the first bridge within the clip, thereby fixing the second eyeglasses relative to the first eyeglasses.

14 Claims, 10 Drawing Sheets

ASSEMBLY OF PRIMARY AND AUXILIARY EYEGLASSES WHICH ARE INTERCONNECTED BY A RETAINER CLIP

BACKGROUND OF THE INVENTION

1. Field of the Invention

This invention relates to eyeglasses, more particularly to an assembly of primary and auxiliary eyeglasses.

2. Description of the Related Art

An eyeglass assembly includes a pair of primary eyeglasses and a pair of auxiliary eyeglasses, which is mounted normally on the primary eyeglasses by the engagement between a bolt and a threaded hole, between an insert pin and a pin-receiving hole, or between mutually attracted magnetic members. In a case where either of the bolt or the insert pin is provided for interconnecting the primary and auxiliary eyeglasses, it is difficult to mount the auxiliary eyeglasses on the primary eyeglasses. In a case where the magnetic members are provided on the primary and auxiliary eyeglasses, a complicated structure is incurred.

SUMMARY OF THE INVENTION

The object of this invention is to provide a relatively simple assembly of primary and auxiliary eyeglasses, in which the auxiliary eyeglasses can be mounted easily on the primary eyeglasses.

Accordingly, an eyeglass assembly of this invention includes a pair of first eyeglasses having two first lenses and a first bridge that interconnects the first lenses, and a pair of second eyeglasses having two second lenses and a second bridge that interconnects the second lenses. A retaining clip is disposed fixedly on the second bridge, and is formed with a restricting groove unit, within which a portion of the first bridge is received fittingly, so as to clamp the portion of the first bridge within the clip, thereby fixing the second eyeglasses relative to the first eyeglasses.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
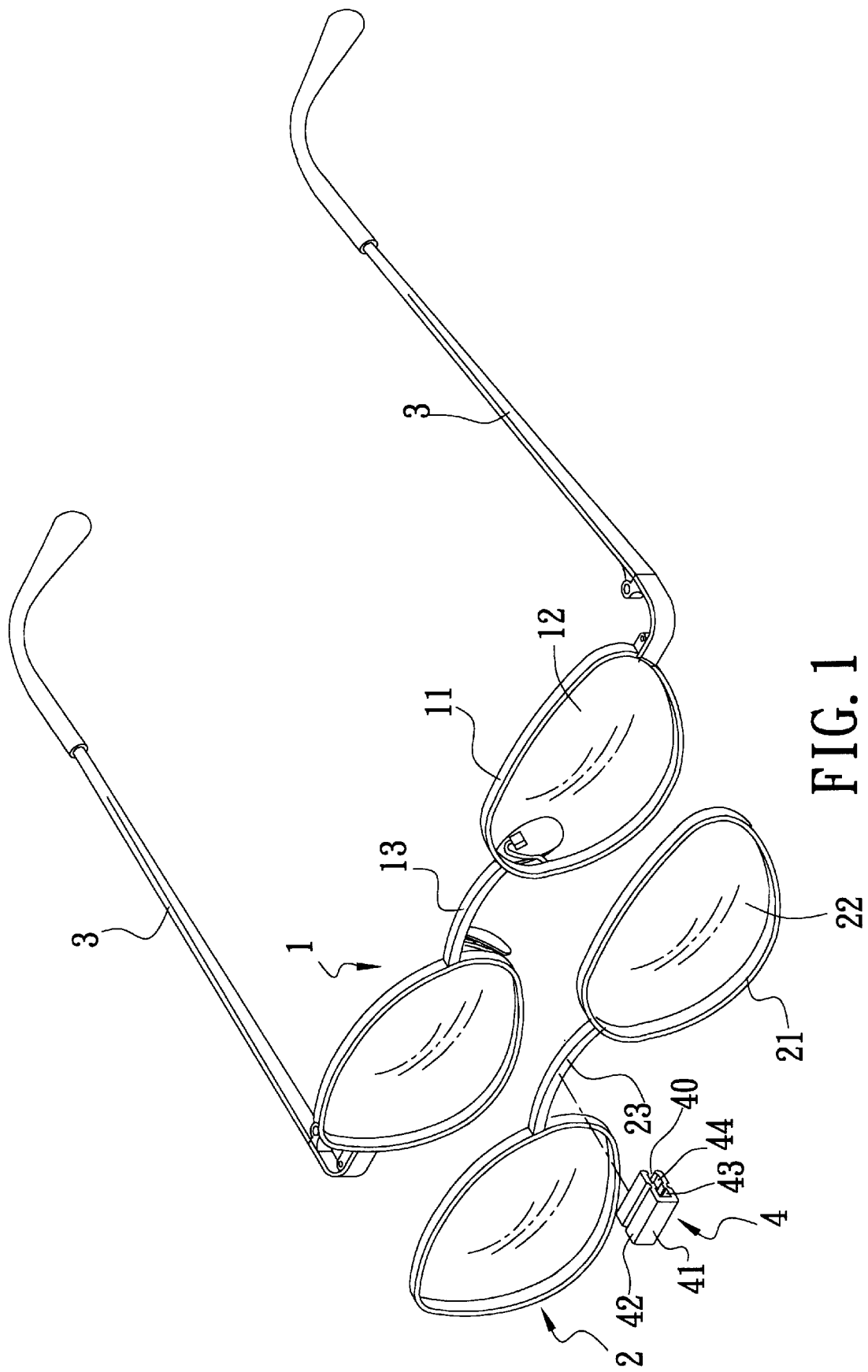
FIG. 1 is a partly exploded perspective view of a first preferred embodiment of an eyeglass assembly according to this invention.
Figure 2:
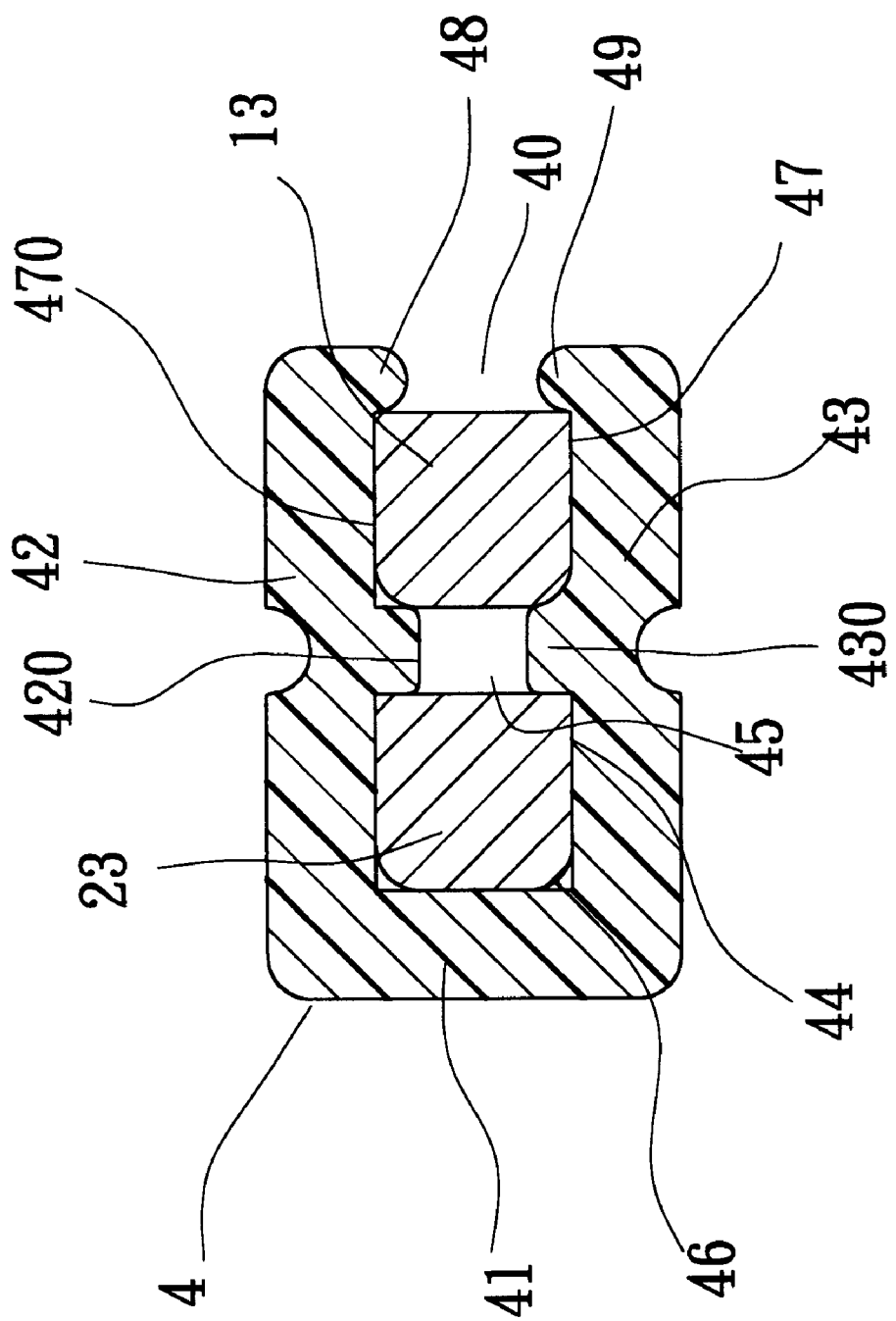
FIG. 2 is a sectional view illustrating how first and second bridges are clamped within a retaining clip in the first preferred embodiment.

Referring to FIGS. 1 and 2, a first preferred embodiment of an eyeglass assembly of this invention is shown to include a pair of first glasses 1, a pair of second glasses 2, a pair of temples 3, and a retaining clip 4. The pair of the first glasses 1 has two first frames 11, two first lenses 12 secured within the first frames 11, respectively, and a first bridge 13 that interconnects the first frames 11. The pair of the second glasses 2 has two second frames 21, two second lenses 22 secured within the second frames 21, and a second bridge 23 that interconnects the second frames 21. The temples 3 are mounted respectively on two sides of the first glasses 1. As such, the pair of the first glasses 1 serves as a pair of primary eyeglasses. The second eyeglasses 2 are auxiliary eyeglasses, which are mounted in front of the first eyeglasses 1 by means of the clip 4. The clip 4 is disposed fixedly on the second bridge 23. In this embodiment, the clip 4 is mounted removably on the second bridge 23.

The first bridge 13 consists of a uniform-width bridging portion, which interconnects the first frames 11. The second bridge 23 consists of a uniform-width bridging portion, which interconnects the second frames 21. The clip 4 is unitary, and has a vertical connecting plate 41, a horizontal upper clamping plate 42, and a horizontal lower clamping plate 43. The upper and lower clamping plates 42, 43 extend respectively, horizontally and rearwardly from upper and lower ends of a rear side surface of the connecting plate 41. Each of the upper and lower clamping plates 42, 43 has an inner surface, which is formed with a positioning rib 420, 430 on a middle portion thereof. A space 44 is formed in the clip 4, and is divided into a narrowed middle space 45 that is located between the ribs 420, 430, a confining space 46 that is located between the connecting plate 41 and the ribs 420, 430 and between the upper and lower clamping plates 42, 43, and a restricting groove unit 47. Each of the upper and lower clamping plates 42, 43 further has a restricting rib 48, 49 that extends from a rear side of an inner surface thereof, thereby defining a narrowed end 40 of the restricting groove unit 47 between the restricting ribs 48, 49. The restricting groove unit 47 is located between the positioning ribs 420, 430 and the restricting ribs 48, 49 and between the upper and lower clamping plates 42, 43. The confining space 46 and the unit 47 are located on two sides of the positioning ribs 420, 430. The bridging portion of the first bridge 13 is received fittingly within an accommodating portion 470 of the restricting groove unit 47, which is wider than the narrowed end 40 and which has a width that is approximate to that of the bridging portion of the first bridge 13. The bridging portion of the second bridge 23 is received fittingly within the confining space 46. As such, the first and second bridges 13, 23 are clamped firmly within the clip 4, thereby fixing the second eyeglasses 2 relative to the first eyeglasses 1.

Figure 3:
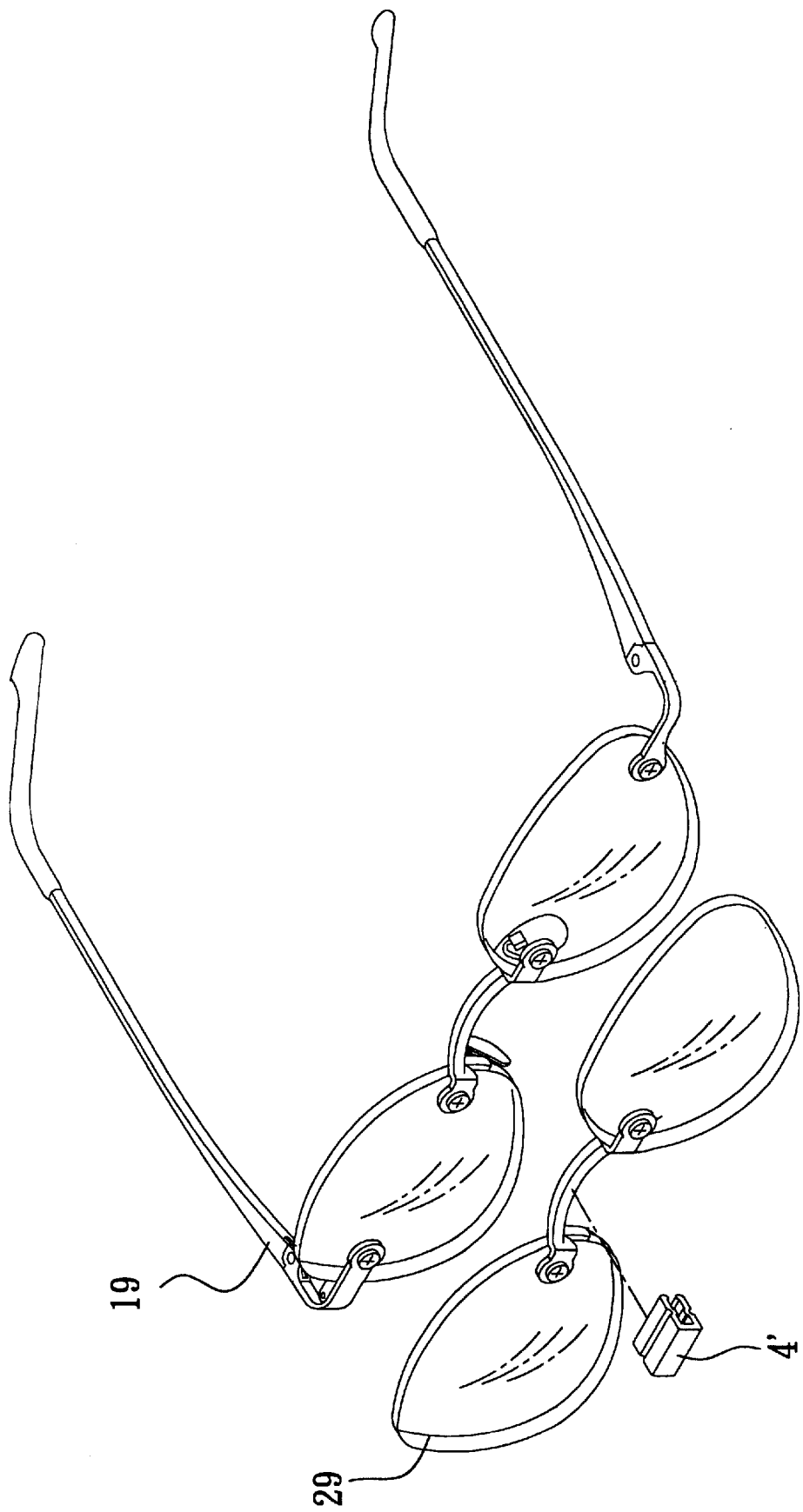
FIG. 3 is a partly exploded perspective view of a second preferred embodiment of an eyeglass assembly according to this invention.

Referring to FIG. 3, a second preferred embodiment of an eyeglass assembly of this invention is shown to include a pair of first frameless eyeglasses 19, a pair of second frameless eyeglasses 29, and a retaining clip 4'. The second frameless eyeglasses 29 are mounted on the first frameless eyeglasses 19 by means of the clip 4' in the same manner as the first embodiment.

Figure 4:
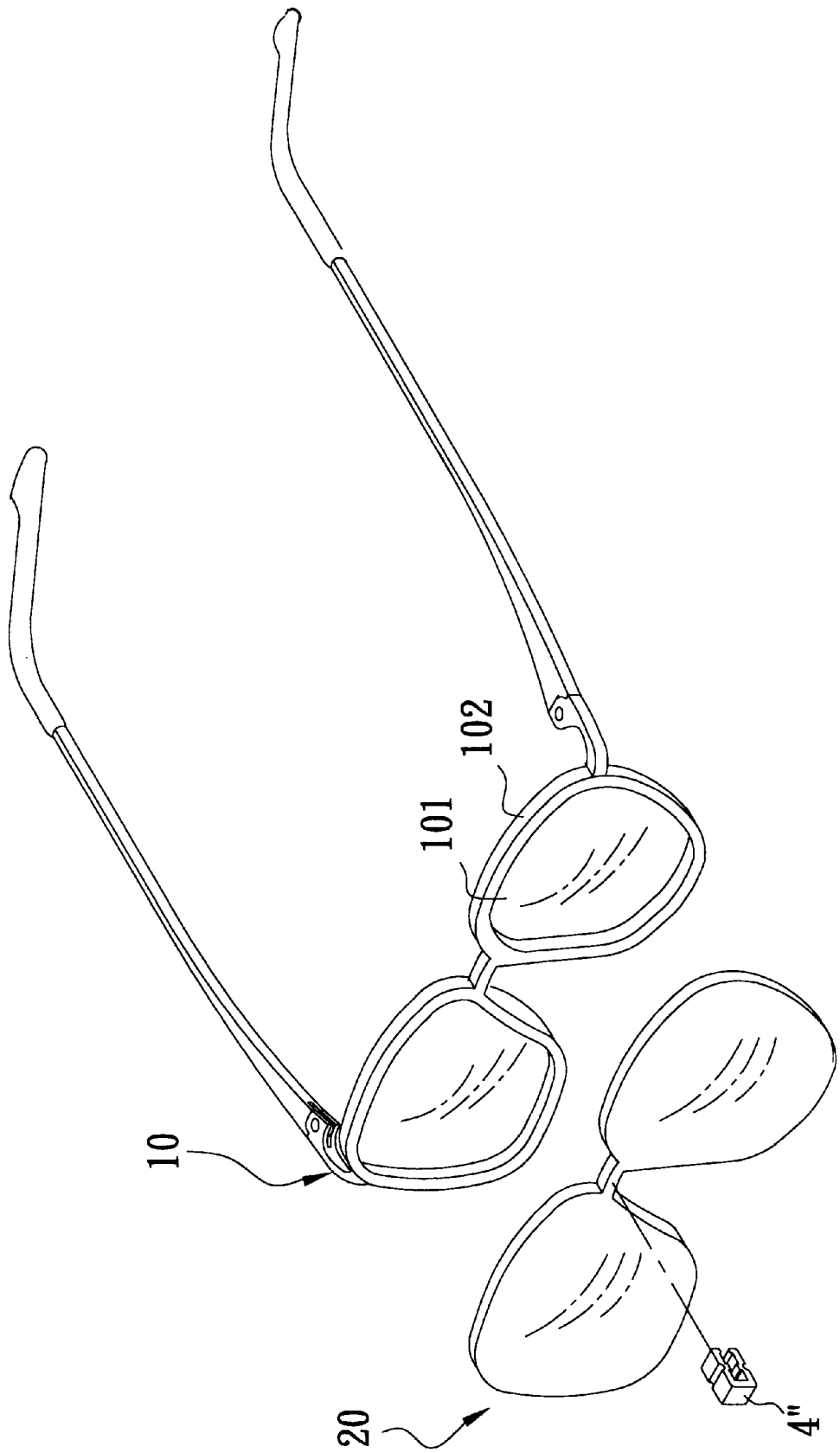
FIG. 4 is a partly exploded perspective view of a third preferred embodiment of an eyeglass assembly according to this invention.

Referring to FIG. 4, a third preferred embodiment of an eyeglass assembly of this invention is shown to include a pair of first eyeglasses 10 having two lenses 101 and two frames 102, a unitary pair of second eyeglasses 20, and a retaining clip 4". The second eyeglasses 20 are also mounted on the first eyeglasses 10 by means of the retaining clip 4" in the same manner as the first embodiment.

Figure 5:
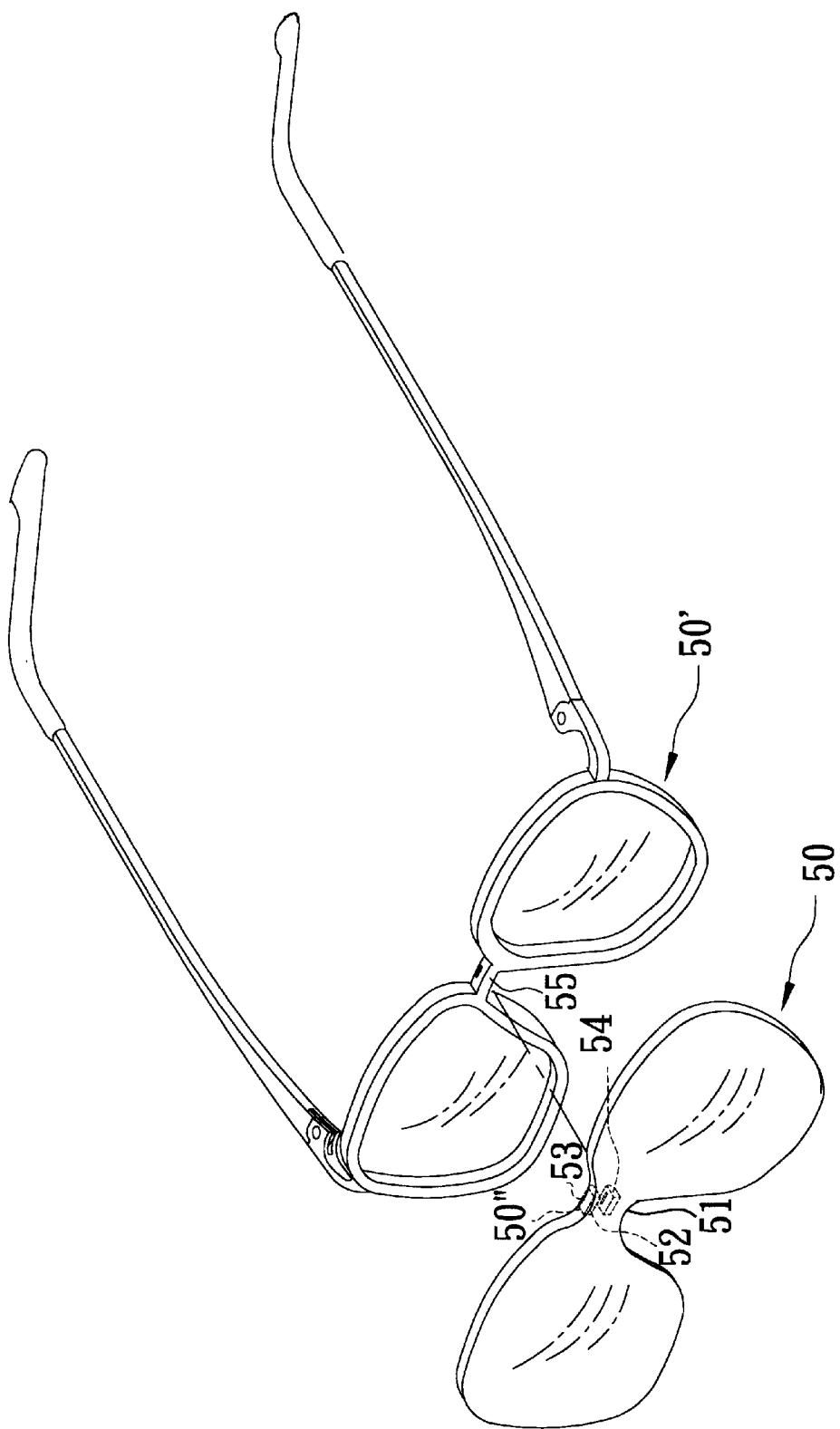
FIG. 5 is a partly exploded perspective view of a fourth preferred embodiment of an eyeglass assembly according to this invention.
Figure 7:
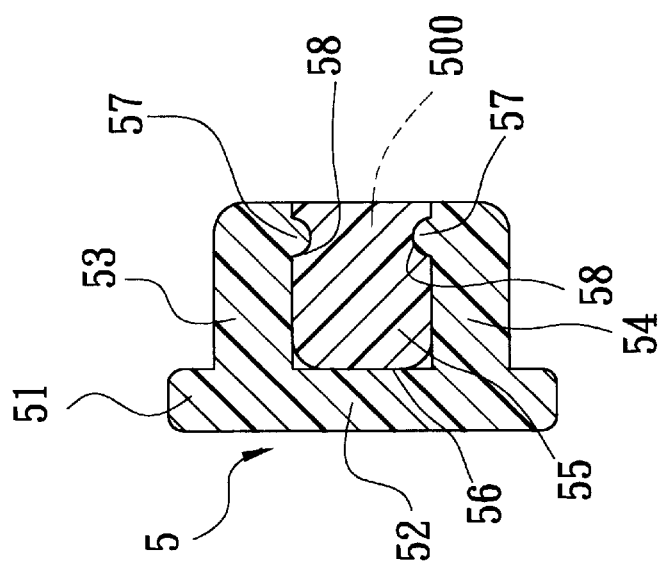
FIG. 7 is a sectional view illustrating how a first bridge is clamped within a retaining clip in the fourth preferred embodiment.
Figure 6:
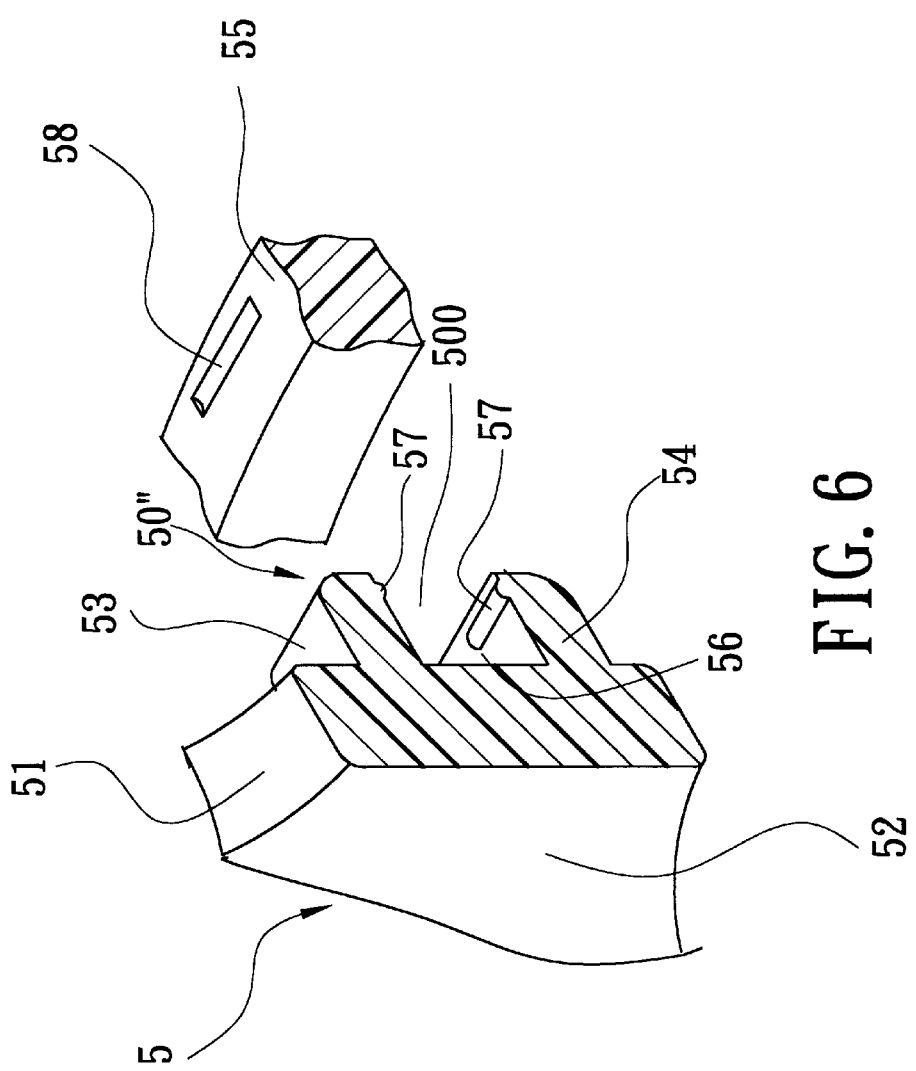
FIG. 6 is an exploded perspective view of a retaining clip of a second bridge and a first bridge in the fourth preferred embodiment.

Referring to FIGS. 5, 6 and 7, a fourth preferred embodiment of an eyeglass assembly 5 of this invention is shown to include a pair of second eyeglasses 50, which has a second bridge 51 and which is mounted on a pair of first eyeglasses 50' by means of a retaining clip 50". The clip 50" has a vertical connecting plate 52, a horizontal upper clamping plate 53 and a horizontal lower clamping plate 54. A first bridge 55 of the first eyeglasses 50' is received fittingly within a restricting groove unit 56 in the clip 50". Each of the upper and lower clamping plates 53, 54 has an inner surface that is formed with a horizontally extending rib 57, thereby defining a narrowed end 500 of the restricting groove unit 56 between the ribs 57. The first bridge 55 has top and bottom surfaces, each of which is formed with a slot 58 that engages a corresponding one of the ribs 57 of the clip 50"0, thereby positioning the first bridge 55 within the clip 50". The assembly of the first bridge 55, second bridge 51 and clip 55" can be modified into any one of four connecting devices 6, 7, 8, 9 (see FIGS. 8, 9, 10 and 11).

Figure 8:
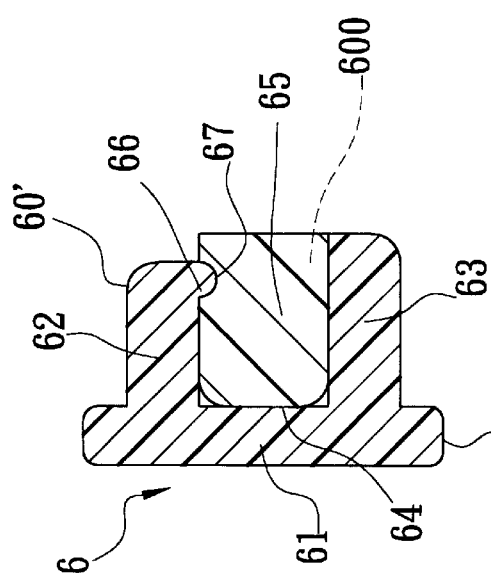
FIG. 8 is a sectional view illustrating how a first bridge is clamped within a retaining clip in a fifth preferred embodiment of an eyeglass assembly according to this invention.

Referring to FIG. 8, the connecting device 6 is shown to include a second bridge 60 and a retaining clip 60'. The clip 60' is generally U-shaped, and has a vertical connecting plate 61 that is formed with a clamping plate 62 that extends integrally and rearwardly from an upper end of the connecting plate 61, and a lower clamping plate 63 that extends integrally and rearwardly from a lower end of the formed within the clip 60' for receiving a first bridge 65 fittingly therewithin. The upper clamping plate 62 has an integral rib 66 that engages a slot 67 in a top surface of the first bridge 65, thereby positioning the first bridge 65 within the clip 60'. The rib 66 and the lower clamping plate 63 define cooperatively a narrowed end 600 of the restricting groove unit 64 therebetween.

Figure 9:
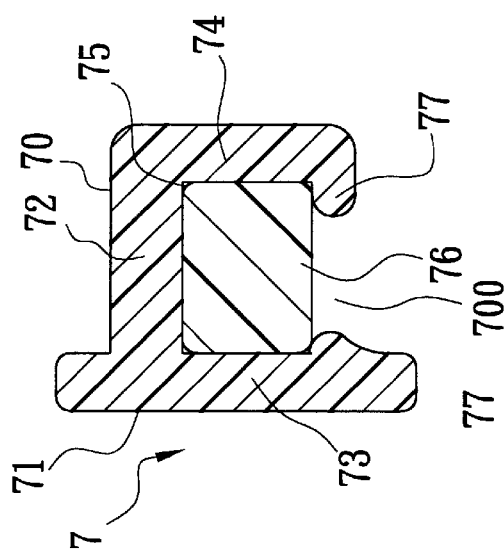
FIG. 9 is a sectional view illustrating how a first bridge is clamped within a retaining clip in a sixth preferred embodiment of an eyeglass assembly according to this invention.

Referring to FIG. 9, the connecting device 7 is shown to include a retaining clip 70 and a second bridge 71. The retaining clip 70 is generally inverted U-shaped, and has a horizontal connecting plate 72, a vertical front clamping plate 73 and a vertical rear clamping plate 74. The front clamping plate 73 is formed integrally on the second bridge 71. The connecting plate 72 has two opposite sides that are formed respectively and integrally with the upper ends of the front and rear clamping plates 73, 74. As such, a restricting groove unit 75 is formed between the front and rear clamping plates 73, 74 and immediately under the connecting plate 72 for receiving a first bridge 76 fittingly therewithin. The front and rear clamping plates 73, 74 have opposed integral ribs 77, which extend inwardly therefrom to define a narrowed end 700 of the restricting groove unit 75 therebetween for preventing removal of the first bridge 76 from the restricting groove unit 75.

Figure 10:
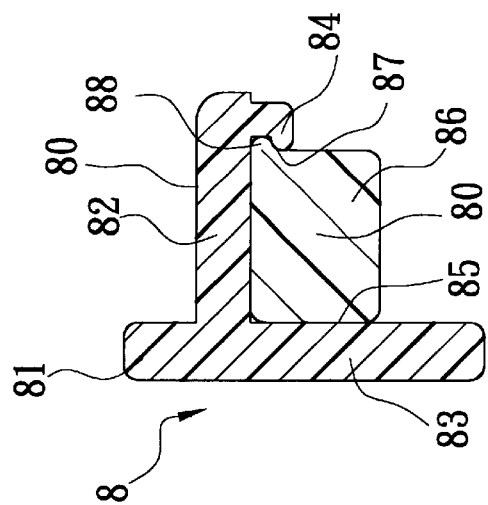
FIG. 10 is a sectional view illustrating how a first bridge is clamped within a retaining clip in a seventh preferred embodiment of an eyeglass assembly according to this invention.

Referring to FIG. 10, the connecting device 8 is shown to include a retaining clip 80 and a second bridge 81. The clip 80 is generally L-shaped, and has a horizontal clamping plate 82 and a vertical connecting plate 83 that is formed integrally on the second bridge 81 and with a front end of the clamping plate 82. The clamping plate 82 has a bottom surface, which is formed with an integral rib 84 that has a generally oval-shaped cross-section so as to define a retaining groove 87 between the clamping plate 82 and the rib 84, thereby defining a restricting groove unit 85 between the connecting plate 83 and the rib 84 and immediately under the clamping plate 82. A first bridge 86 has a front side surface that abuts against the connecting plate 83, a top surface that abuts against the bottom surface of the clamping plate 82, and a rear side surface with a sharp edge 88 that extends rearwardly and integrally from an upper end thereof into the retaining groove 87 between the clamping plate 82 and the rib 84.

Figure 11:
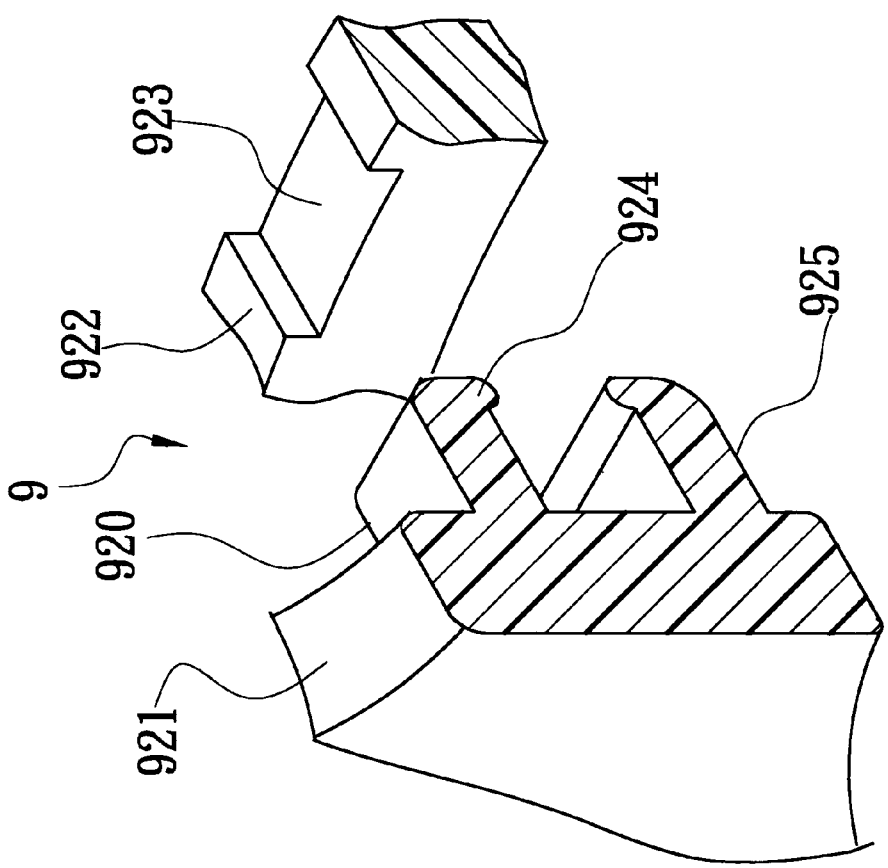
FIG. 11 is an exploded perspective view of a retaining clip of a second bridge and a first bridge in an eighth preferred embodiment of an eyeglass assembly according to this invention.

Referring to FIG. 11, the connecting device 9 is shown to include a retaining clip 920, a second bridge 921 and a first bridge 923. The clip 920 is formed integrally on the second bridge 921, and has a horizontal upper clamping plate 924 and a horizontal lower clamping plate 925, which clamp the first bridge 922 therebetween. The first bridge 922 has a top surface, which is formed with a positioning recess 923 that engages the upper clamping plate 924 of the clip 920 for positioning the clip 920 on the first bridge 922.

Figure 12:
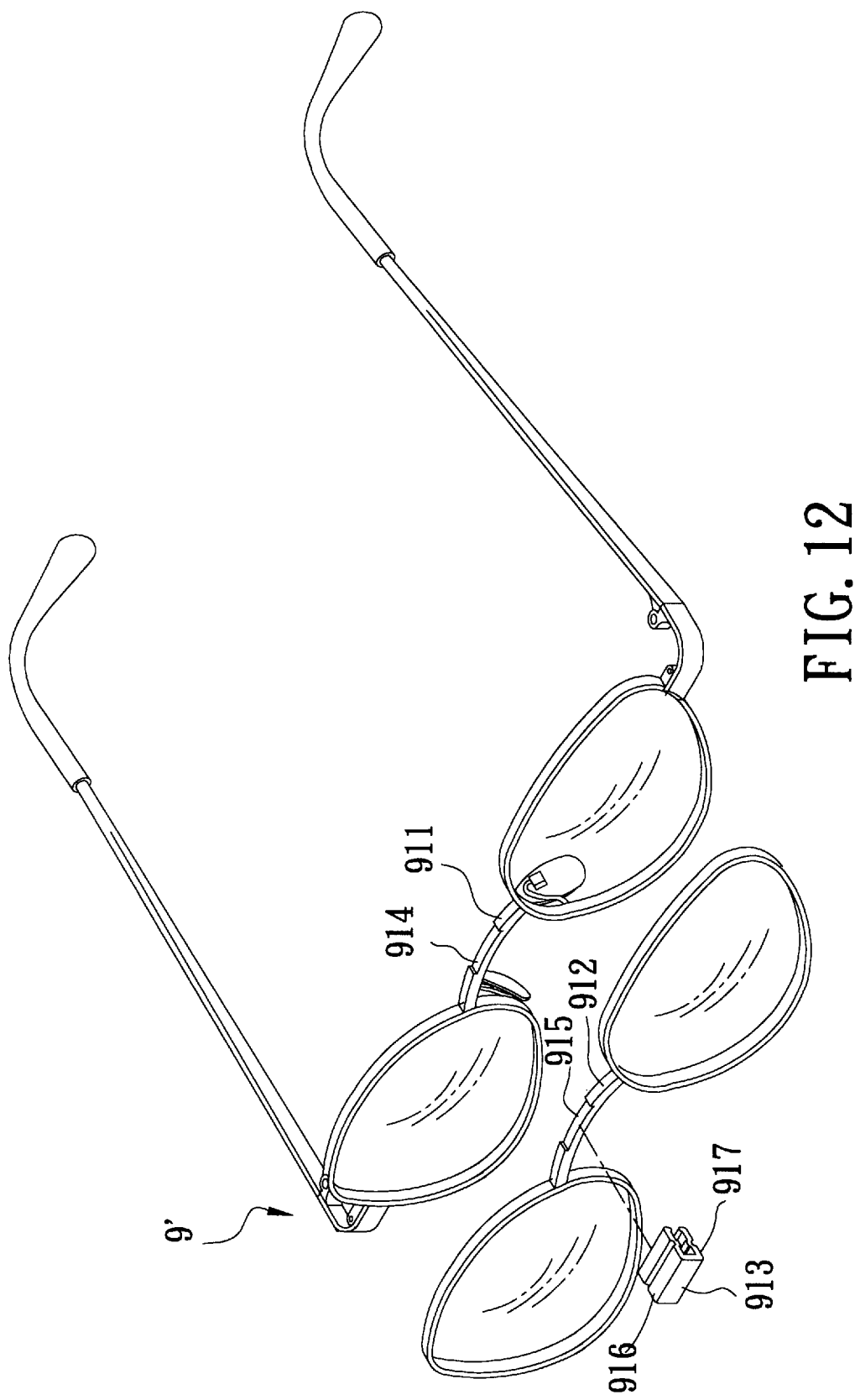
FIG. 12 is a partly exploded perspective view of a ninth preferred embodiment of an eyeglass assembly according to this invention.

Referring to FIG. 12, another preferred embodiment of an eyeglass assembly 9' of this invention is shown to include a pair of first eyeglasses with a first bridge 911, a pair of second eyeglasses with a second bridge 912, and a retaining clip 913. Each of the first and second bridges 911, 912 is formed with a positioning recess 914, 915. The clip 913 has a horizontal upper clamping plate 916 and a horizontal lower clamping plate 917. The upper clamping plate 916 engages the positioning recesses 914, 915 in the first and second bridges 911, 912 for positioning the clip 913 on the first and second bridges 911, 912.

Figure 13:
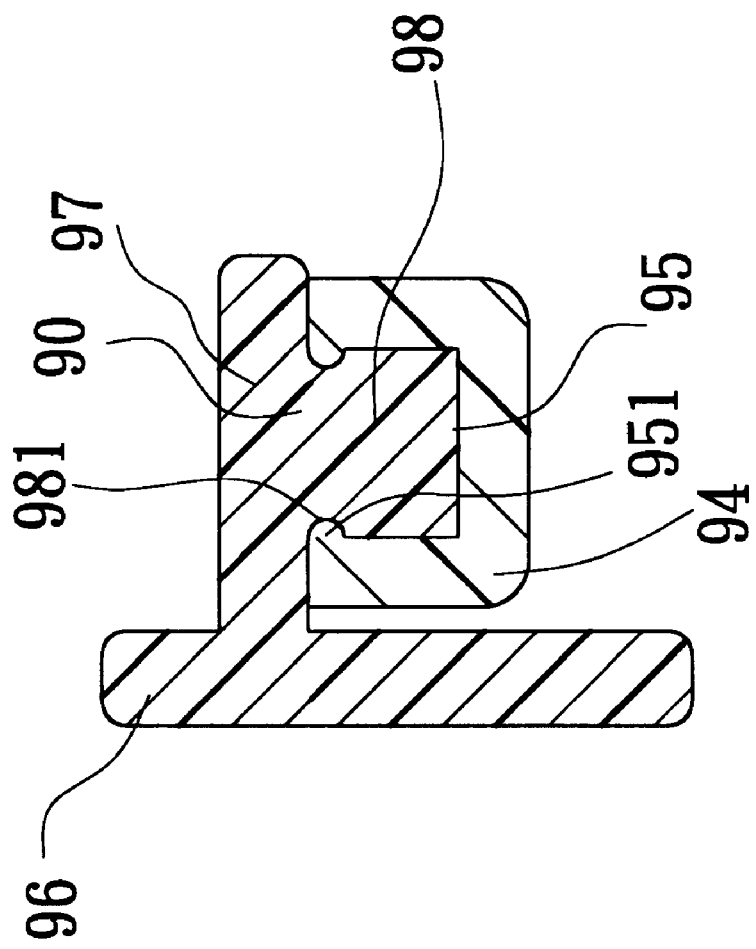
FIG. 13 is a sectional view illustrating a first bridge is clamped within a retaining clip in a tenth preferred embodiment of an eyeglass assembly according to this invention.

FIG. 13 illustrates a connecting device for primary and auxiliary eyeglasses, which includes a second bridge 94 with a top surface that is formed with a restricting groove unit 95 so as to constitute a retaining clip in the second bridge 94. The second bridge 94 is provided on the primary eyeglasses. In this embodiment, a first bridge 96 is disposed on the auxiliary eyeglasses in front of the second bridge 94, and is formed integrally with a horizontal plate 97, which has a bottom surface with an insert block 98 that is received fittingly within the restricting groove unit 95. The insert block 98 has two opposed and open-ended horizontal slots 981 on two opposite side surfaces thereof. The second bridge 94 has two opposed horizontal ribs 951 that engage respectively the slots 981 in the insert block 98 and that define a narrowed end of the restricting groove unit 95 therebetween for preventing removal of the horizontal plate 97 from the restricting groove unit 95 in the second bridge 94.

With this invention thus explained, it is apparent that numerous modifications and variations can be made without departing from the scope and spirit of this invention. It is therefore intended that this invention be limited only as indicated by the appended claims.

I claim:

1. An eyeglass assembly comprising:
   a pair of first eyeglasses having two first lenses and a first bridge that interconnects said first lenses;
   a pair of second eyeglasses having two second lenses and a second bridge that interconnects said second lenses; and
   a unitary retaining clip having a vertical connecting plate, an upper clamping plate extending from an upper end of said vertical connecting plate, and a lower clamping plate extending from a lower end of said vertical connecting plate and disposed under said upper clamping plate, said upper and lower clamping plates defining a confining space and a restricting groove unit therebetween, said restricting groove unit having a narrowed end and an accommodating portion, said confining space being located between said restricting groove unit and said vertical connecting plate for confining said first bridge therewithin, said second bridge being clamped between said upper and lower clamping plates of said clip and being received fittingly within said accommodating portion of said restricting groove unit in said clip.

2. The eyeglass assembly as claimed in claim 1, wherein each of said upper and lower clamping plates has an inner surface, which is formed with a positioning rib on a middle portion thereof that is located between said confining space and said restricting groove unit, said positioning ribs defining a narrowed middle space therebetween, which is communicated with said confining space and said restricting groove unit.

3. The eyeglass assembly as claimed in claim 1, wherein each of said first and second bridges is formed with a positioning recess, within which a portion of said clip engages fittingly, thereby positioning said clip on said first and second bridges.

4. The eyeglass assembly as claimed in claim 3, wherein each of said first and second bridges has a top surface, in which a respective one of said positioning recesses is formed, said upper clamping plate having two portions that engage respectively and fittingly said positioning recesses in said first and second bridges.

5. An eyeglass assembly comprising:
   a pair of first eyeglasses having two first lenses and a first bridge that interconnects said first lenses;
   a pair of second eyeglasses having two second lenses and a second bridge that interconnects said second lenses; and
   a retaining clip formed integrally on said second bridge and formed with a restricting groove unit, within which a portion of said first bridge is received fittingly, so as to clamp said portion of said first bridge within said clip, thereby fixing said second eyeglasses relative to said first eyeglasses, said restricting groove having a narrowed end, via which said first bridge can be removed forcibly from said clip.

6. The eyeglass assembly as claimed in claim 5, wherein said first bridge is formed with a positioning recess, within which a portion of said clip engages fittingly, thereby positioning said clip on said first bridge.

7. The eyeglass assembly as claimed in claim 6, wherein said first bridge has a top surface, in which said positioning recess is formed, said clip having a horizontal upper clamping plate and a horizontal lower clamping plate, between which said restricting groove unit is defined, said upper clamping plate engaging said positioning recess in said first bridge for positioning said clip on said first bridge.

8. The eyeglass assembly as claimed in claim 5, wherein said clip has two spaced-apart horizontal clamping plates, each of which has an inner surface that is formed with a horizontally extending rib, thereby defining a narrowed end of said restricting groove unit between said ribs.

9. The eyeglass assembly as claimed in claim 8, wherein said first bridge has top and bottom surfaces, each of which is formed with a slot that engages a corresponding one of said ribs of said clip, thereby positioning said first bridge within said clip.

10. The eyeglass assembly as claimed in claim 5, wherein said pair of said first eyeglasses is provided with two temples on two sides thereof so as to serve as a pair of primary eyeglasses, said second eyeglasses being a pair of auxiliary eyeglasses and being disposed in front of said primary eyeglasses.

11. The eyeglass assembly as claimed in claim 10, wherein said clip is generally U-shaped, and has a horizontal upper clamping plate, a horizontal lower clamping plate and a vertical connecting plate that is formed integrally with said upper clamping plate at an upper end thereof and with said lower clamping plate at a lower end thereof and that is formed integrally on said second bridge, said first bridge having a top surface that is formed with a slot, said upper clamping plate of said clip having an integral rib that engages said slot in said first bridge, thereby positioning said first bridge within said clip, said restricting groove unit in said clip being defined between said connecting plate and said rib of said upper clamping plate and between said upper and lower clamping plates.

12. The eyeglass assembly as claimed in claim 10, wherein said clip is generally inverted U-shaped, and has a vertical front clamping plate that is formed integrally on said second bridge, a vertical rear clamping plate and a horizontal connecting plate, which has two opposite sides that are formed respectively and integrally with upper ends of said front and rear clamping plates, said restricting groove unit being located between said front and rear clamping plates and immediately under said connecting plate.

13. The eyeglass assembly as claimed in claim 10, wherein said clip is generally L-shaped, and has a vertical connecting plate that is formed integrally on said second bridge, and a horizontal clamping plate, which has a front end that is formed integrally with said connecting plate, said horizontal clamping plate having a bottom surface, which is formed with an integral rib that has a generally oval-shaped cross-section so as to define a retaining groove between said clamping plate and said rib, thereby defining said restricting groove unit between said connecting plate and said rib and immediately under said clamping plate, said first bridge having a front side surface that buts against said connecting plate, a top surface that abuts against said bottom surface of said clamping plate, and a rear side surface with a sharp edge that extends rearwardly and integrally from an upper end thereof into said retaining groove between said clamping plate and said rib.

14. The eyeglass assembly as claimed in claim 5, wherein said second eyeglasses are primary eyeglasses, said first eyeglasses being auxiliary eyeglasses that are disposed in front of said primary eyeglasses, said second bridge having a top surface that is formed with said restricting groove unit so as to constitute said clip in said second bridge, said first bridge being formed integrally with a horizontal plate, which has a bottom surface with an insert block that is received fittingly within said restricting groove unit, said insert block having two opposed and open-ended horizontal slots on two opposite side surfaces thereof, said second bridge having two opposed horizontal ribs that engage respectively said slots in said insert block for preventing removal of said horizontal plate from said restricting groove unit in said second bridge.

* * * * *

UNITED STATES PATENT AND TRADEMARK OFFICE
CERTIFICATE OF CORRECTION

PATENT NO. : 6,264,323 B1  Page 1 of 1
DATED : July 24, 2001
INVENTOR(S) : David Chao It is certified that error appears in the above-identified patent and that said Letters Patent is hereby corrected as shown below:

Column 3,
Line 37, "50''O" should be -- 50'' --.
Line 47, after "the" insert -- connecting plate 61. A restricting groove unit 64 is --.

Signed and Sealed this

Ninth Day of July, 2002

Attest:

Attesting Officer

JAMES E. ROGAN
Director of the United States Patent and Trademark Office